US008293428B2

(12) United States Patent
Yamamoto et al.

(10) Patent No.: US 8,293,428 B2
(45) Date of Patent: Oct. 23, 2012

(54) GAS DIFFUSION ELECTRODE MATERIAL AND PRODUCTION METHOD THEREOF

(75) Inventors: Shinji Yamamoto, Yokosuka (JP); Miyuki Terado, Kawasaki (JP); Masahiro Yamamoto, Yokohama (JP); Kenichi Ochiai, Atsugi (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 1125 days.

(21) Appl. No.: 11/992,516

(22) PCT Filed: Sep. 6, 2006

(86) PCT No.: PCT/JP2006/317613
§ 371 (c)(1),
(2), (4) Date: Mar. 25, 2008

(87) PCT Pub. No.: WO2007/037103
PCT Pub. Date: Apr. 5, 2007

(65) Prior Publication Data
US 2009/0117433 A1 May 7, 2009

(30) Foreign Application Priority Data

Sep. 28, 2005 (JP) .................................. 2005-281141
Feb. 23, 2006 (JP) .................................. 2006-046126

(51) Int. Cl.
*H01M 4/02* (2006.01)
*H01M 4/36* (2006.01)
*H01M 8/10* (2006.01)
*H01M 8/00* (2006.01)

(52) U.S. Cl. ...................... 429/530; 429/400; 429/480

(58) Field of Classification Search .................. 429/530, 429/400, 480
See application file for complete search history.

(56) References Cited

U.S. PATENT DOCUMENTS

| | | | |
|---|---|---|---|
| 4,339,325 A * | 7/1982 | Solomon et al. | ............... 204/296 |
| 5,672,439 A | 9/1997 | Wilkinson et al. | |
| 5,910,378 A | 6/1999 | Debe et al. | |
| 6,060,190 A | 5/2000 | Campbell et al. | |
| 6,416,896 B1 * | 7/2002 | Tamaru et al. | ............... 429/534 |
| 6,723,464 B2 | 4/2004 | Tabata et al. | |
| 6,756,150 B2 * | 6/2004 | Karuppaiah et al. | ........... 429/480 |

(Continued)

FOREIGN PATENT DOCUMENTS

JP 59-043889 A 3/1984

(Continued)

OTHER PUBLICATIONS

Extended European Search Report Application No. EP 06797509.4 dated Jul. 13, 2012.

*Primary Examiner* — Helen O Conley
(74) *Attorney, Agent, or Firm* — Foley & Lardner LLP

(57) ABSTRACT

A gas diffusion electrode material of the present invention includes: a porous body (1) formed of continuous and discontinuous polytetrafluoroethylene microfibers (2) and having three-dimensionally continuous micropores (4); and a conductive material (3) supported on the porous body (1). Moreover, a density of the polytetrafluoroethylene microfiber (2) is lower in a surface region (1A) of a cross section of the porous body (1) than in an intermediate region (1B) of the cross section. In accordance with the present invention, the polytetrafluoroethylene having the predetermined three-dimensional structure is used, and so on. Therefore, it is possible to provide a gas diffusion electrode material excellent in power generation characteristics and durability.

17 Claims, 8 Drawing Sheets

U.S. PATENT DOCUMENTS

2007/0224479 A1 * 9/2007 Tadokoro et al. ............... 429/30

FOREIGN PATENT DOCUMENTS

| | | |
|---|---|---|
| JP | 2000-299113 A | 10/2000 |
| JP | 2001-057215 A | 2/2001 |
| JP | 2001-084831 A | 3/2001 |
| JP | 2001-126737 A | 5/2001 |
| JP | 2001-216972 A | 8/2001 |
| JP | 2001-514783 A | 9/2001 |
| JP | 2001-1514785 A | 9/2001 |
| JP | 2001-520445 A | 10/2001 |
| JP | 2001-345110 A | 12/2001 |
| WO | WO 01/37357 A2 | 5/2001 |

* cited by examiner

FIG. 1
(A)
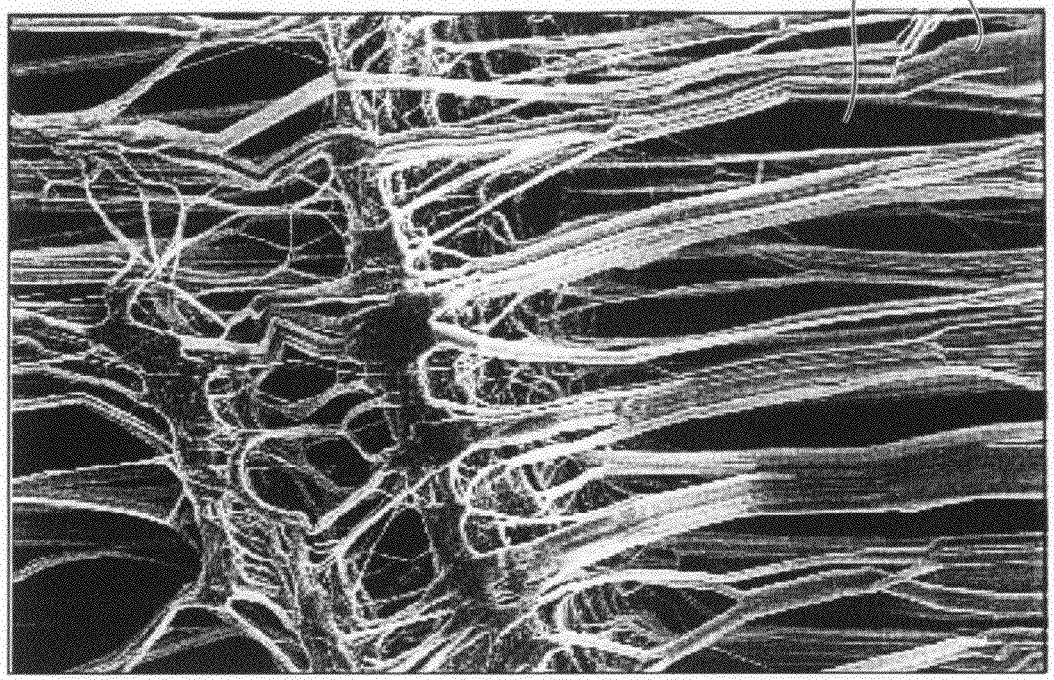
(B)
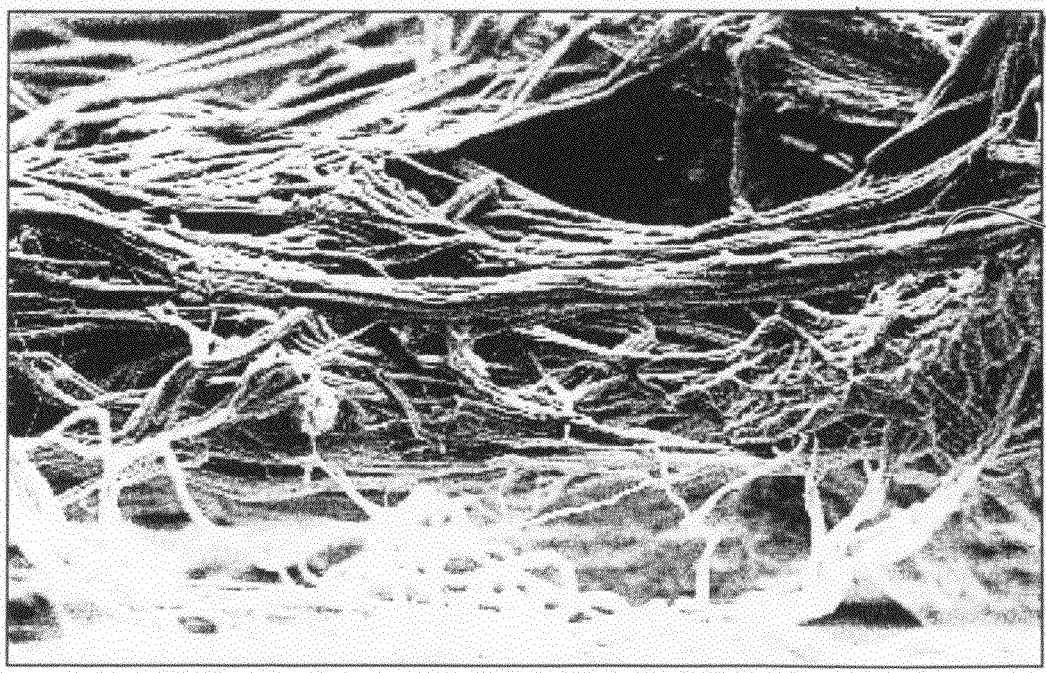

FIG. 3
(A)
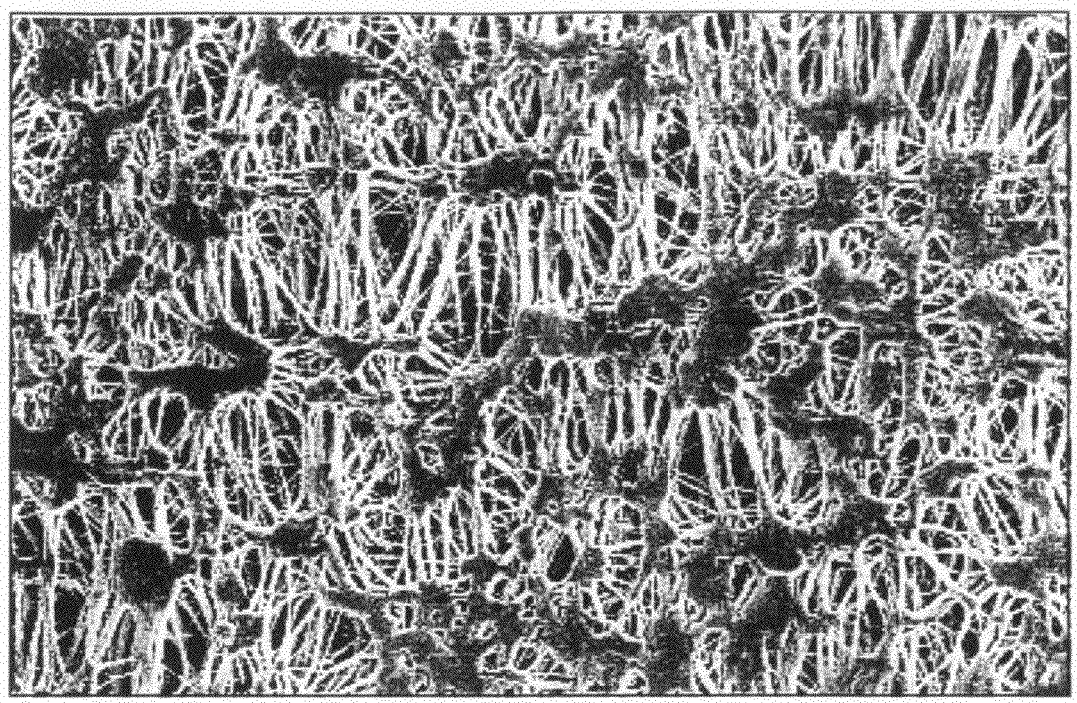
(B)
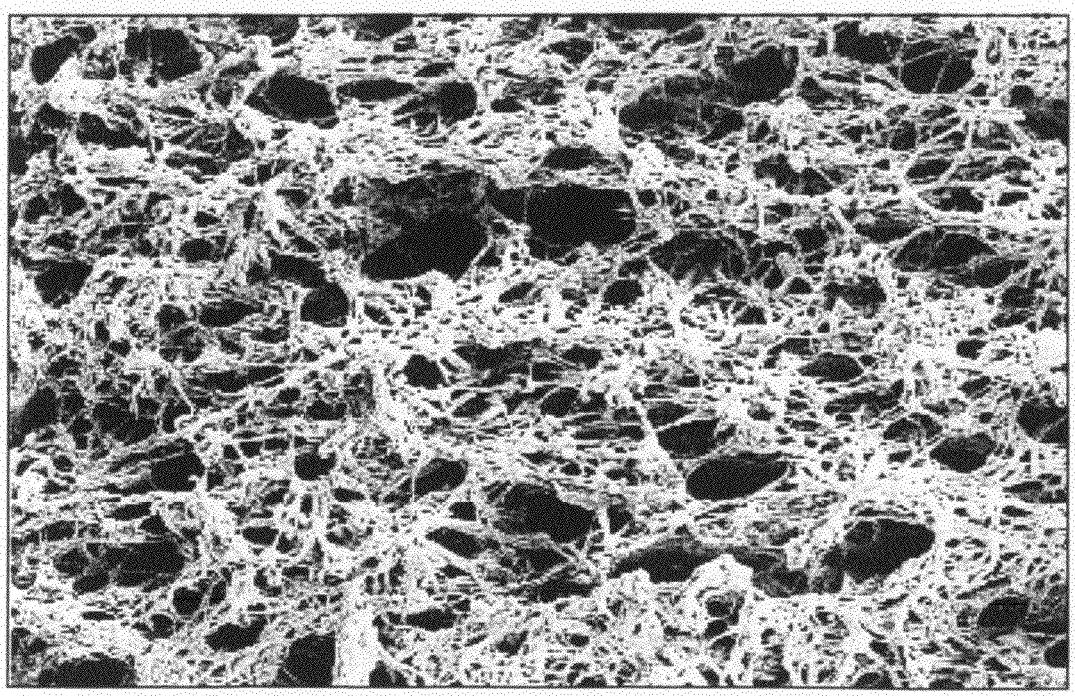

|  | GAS DIFFUSION ELECTRODE MATERIAL | | | | ANODE CATALYST LAYER | |
|---|---|---|---|---|---|---|
|  | COMPOSITION (PTFE):(Conductor) | TYPE OF CARBON | COATED AMOUNT (mg/cm2) | POROSITY (%) | AMOUNT OF Pt (mg/cm2) | TYPE OF CARBON |
| EXAMPLE 1 | 30:70 | ACETYLENE BLACK | 1.0 | 70 | 0.2 | KETJEN BLACK |
| EXAMPLE 2 | 20:80 | ACETYLENE BLACK | 1.0 | 72 | 0.2 | KETJEN BLACK |
| EXAMPLE 3 | 40:60 | ACETYLENE BLACK | 1.0 | 70 | 0.2 | KETJEN BLACK |
| EXAMPLE 4 | 50:50 | ACETYLENE BLACK | 1.0 | 70 | 0.2 | KETJEN BLACK |
| EXAMPLE 5 | 70:30 | ACETYLENE BLACK | 1.0 | 69 | 0.2 | KETJEN BLACK |
| EXAMPLE 6 | 30:70 | ACETYLENE BLACK | 0.5 | 80 | 0.2 | KETJEN BLACK |
| EXAMPLE 7 | 50:50 | ACETYLENE BLACK | 0.5 | 78 | 0.2 | KETJEN BLACK |
| EXAMPLE 8 | 30:70 | ACETYLENE BLACK | 1.5 | 63 | 0.2 | KETJEN BLACK |
| EXAMPLE 9 | 50:50 | ACETYLENE BLACK | 1.5 | 62 | 0.2 | KETJEN BLACK |
| EXAMPLE 10 | 30:70 | ACETYLENE BLACK | 2.0 | 54 | 0.2 | KETJEN BLACK |
| EXAMPLE 11 | 30:70 | VULCAN | 1.0 | 70 | 0.2 | KETJEN BLACK |
| EXAMPLE 12 | 30:70 | VULCAN | 1.0 | 70 | 0.2 | KETJEN BLACK |
| EXAMPLE 13 | 30:70 | KETJEN BLACK | 1.0 | 68 | 0.2 | KETJEN BLACK |
| EXAMPLE 14 | 30:70 | GRAPHITIZED KETJEN BLACK | 1.0 | 72 | 0.2 | KETJEN BLACK |
| EXAMPLE 15 | 30:70 | ACETYLENE BLACK | 1.0 | 70 | 0.2 | KETJEN BLACK |
| EXAMPLE 16 | 30:70 | ACETYLENE BLACK | 1.0 | 70 | 0.2 | KETJEN BLACK |
| COMPARATIVE EXAMPLE 1 | 30:70 | ACETYLENE BLACK | 2.0 | 40 | 0.2 | KETJEN BLACK |
| COMPARATIVE EXAMPLE 2 | 30:70 | ACETYLENE BLACK | 1.0 | 50 | 0.2 | KETJEN BLACK |
| COMPARATIVE EXAMPLE 3 | 30:70 | ACETYLENE BLACK | 1.0 | 50 | 0.2 | KETJEN BLACK |

FIG. 8B

| CATHODE CATALYST LAYER | | I-V PERFORMANCE | | DURABILITY |
|---|---|---|---|---|
| AMOUNT OF Pt (mg/cm²) | TYPE OF CARBON | POWER GENERATION PERFORMANCE (V@1A/cm²) | RESISTANCE LOSS (mohm·cm² @ 1A/cm²) | NUMBER OF STARTS AND STOPS (NUMBER OF TIMES) |
| 0.4 | GRAPHITIZED KETJEN BLACK | 0.55 | 80 | 2650 |
| 0.4 | GRAPHITIZED KETJEN BLACK | 0.54 | 80 | 2600 |
| 0.4 | GRAPHITIZED KETJEN BLACK | 0.56 | 80 | 2670 |
| 0.4 | GRAPHITIZED KETJEN BLACK | 0.57 | 80 | 2700 |
| 0.4 | GRAPHITIZED KETJEN BLACK | 0.55 | 80 | 2680 |
| 0.4 | GRAPHITIZED KETJEN BLACK | 0.58 | 90 | 2960 |
| 0.4 | GRAPHITIZED KETJEN BLACK | 0.59 | 90 | 2930 |
| 0.4 | GRAPHITIZED KETJEN BLACK | 0.56 | 70 | 2550 |
| 0.4 | GRAPHITIZED KETJEN BLACK | 0.55 | 70 | 2530 |
| 0.4 | GRAPHITIZED KETJEN BLACK | 0.54 | 70 | 2450 |
| 0.4 | KETJEN BLACK | 0.57 | 80 | 1040 |
| 0.4 | GRAPHITIZED KETJEN BLACK | 0.56 | 80 | 2450 |
| 0.4 | GRAPHITIZED KETJEN BLACK | 0.56 | 80 | 2580 |
| 0.4 | GRAPHITIZED KETJEN BLACK | 0.57 | 80 | 2730 |
| 0.4 | GRAPHITIZED KETJEN BLACK | 0.58 | 70 | 2810 |
| 0.4 | GRAPHITIZED KETJEN BLACK | 0.56 | 80 | 2510 |
| 0.4 | GRAPHITIZED KETJEN BLACK | 0.50 | 100 | 1850 |
| 0.4 | GRAPHITIZED KETJEN BLACK | 0.52 | 120 | 2050 |
| 0.4 | KETJEN BLACK | 0.54 | 120 | 540 |

FROM FIG. 8A

GAS DIFFUSION ELECTRODE MATERIAL AND PRODUCTION METHOD THEREOF

TECHNICAL FIELD

The present invention relates to a gas diffusion electrode material and a production method thereof, and more specifically, to a gas diffusion electrode material excellent in power generation characteristics and durability, to a production method thereof, and to a gas diffusion electrode.

BACKGROUND ART

Heretofore, in a membrane electrode assembly (MEA) of a solid oxide fuel cell, there has been known a multilayer structure in which electrode structures (three-phase structures), each being formed of a catalyst in which platinum is supported on carbon particles and of ionomer, are bonded to both sides of an electrolyte membrane, and further, gas diffusion layers are arranged thereon.

For electrode catalyst layers of the three-phase structure, it has been proposed to enhance drainage thereof by adding a water-repellent agent such as polytetrafluoroethylene (PTFE) to the electrode catalyst layers, by using highly hydrophobic carbon black and carbon black subjected to hydrophobic treatment, and so on (refer to Japanese Patent Unexamined Publication No. S59-43889).

DISCLOSURE OF INVENTION

However, in such conventional electrode catalyst layers of the three-phase structure, owing to repetition of an operation of the fuel cell, there occur corrosion of the carbon and decomposition and deterioration of the ionomer, and thus the structure of the electrode catalyst layers is prone to be deformed/deteriorated. In the electrode catalyst layers deformed/deteriorated as described above, there has been a problem that gas diffusibility and drainage of generated water are decreased, resulting in an increase of a concentration overvoltage.

Meanwhile, in an electric vehicle and the like, such a deterioration following load variations caused by repetition of start and stop thereof is more extensive than in other purposes, and it cannot be said that even the electrodes described in Japanese Patent Unexamined Publication No. S59-43889 are not sufficient yet.

On the other hand, in the solid oxide fuel cell, as such a gas diffusion layer, heretofore, there has been widely used one, in which carbon paper or carbon cloth is used as a support material, and slurry containing a conductive substance such as the carbon particles and a water-repellent substance such as polytetrafluoroethylene (PTFE) is applied on the support, whereby a porous layer (a mill layer) is fabricated.

However, in the porous layer (the mill layer) as the gas diffusion layer, which is as described above, a pore shape and porosity thereof are determined substantially uniquely by amounts of carbon particle species and PTFE as constituents. Therefore, when the amount of PTFE is increased for the purpose of enhancing the drainage, there has been a case where the porosity is decreased, and the gas diffusibility is inhibited. Meanwhile, when the amount of PTFE is reduced for the purpose of enhancing the gas diffusibility, there has been a case where the drainage becomes worse.

Therefore, there has been proposed a gas diffusion electrode material that controls a pore diameter of the porous layer (the mill layer) as the gas diffusion layer by using two types of carbon materials different in pore diameter, thereby enhancing the drainage (refer to Japanese Patent Unexamined Publication No. 2001-57215).

However, in the gas diffusion electrode material described in Japanese Patent Unexamined Publication No. 2001-57215, ranges of controllable pore diameter and porosity are narrow, and accordingly, there has been a case where sufficient drainage is not obtained. Moreover, slurry containing the carbon particles is applied on an electrode base material, the gas diffusion electrode is thereby fabricated, and accordingly, there has been a case where the carbon particles are adhered into pores of the base material, and the pores of the base material are filled therewith, whereby gas permeability is significantly decreased.

The present invention has been made in consideration for the problems as described above, which are inherent in the conventional technologies. It is an object of the present invention to provide a gas diffusion electrode material excellent in power generation characteristics and durability, a production method thereof, and a gas diffusion electrode.

A gas diffusion electrode material according to a first aspect of the present invention includes: a porous body formed of continuous and discontinuous polytetrafluoroethylene microfibers and having three-dimensionally continuous micropores; and a conductive material supported on the porous body, wherein a density of the polytetrafluoroethylene microfiber is lower in a surface region of a cross section of the porous body than in an intermediate region of the cross section.

A method for producing a gas diffusion electrode material according to a second aspect of the present invention includes the steps of: hydrophilizing a porous body formed of continuous and discontinuous polytetrafluoroethylene microfibers and having three-dimensionally continuous micropores; impregnating and adhering slurry containing a conductive material into and onto the hydrophilized porous body; and performing heat treatment for the porous body onto which the conductive material is adhered.

BRIEF DESCRIPTION OF DRAWINGS

FIG. 1 is electron microscope photographs of a porous body in an example of a gas diffusion electrode material of the present invention.

FIG. 3 is electron microscope photographs of a porous body in a conventional gas diffusion electrode material.

FIG. 8A is a table showing configurations and evaluation results of examples and comparative examples.

FIG. 8B is a table showing the configurations and evaluation results of the examples and the comparative examples.

BEST MODE FOR CARRYING OUT THE INVENTION

Figure 2:
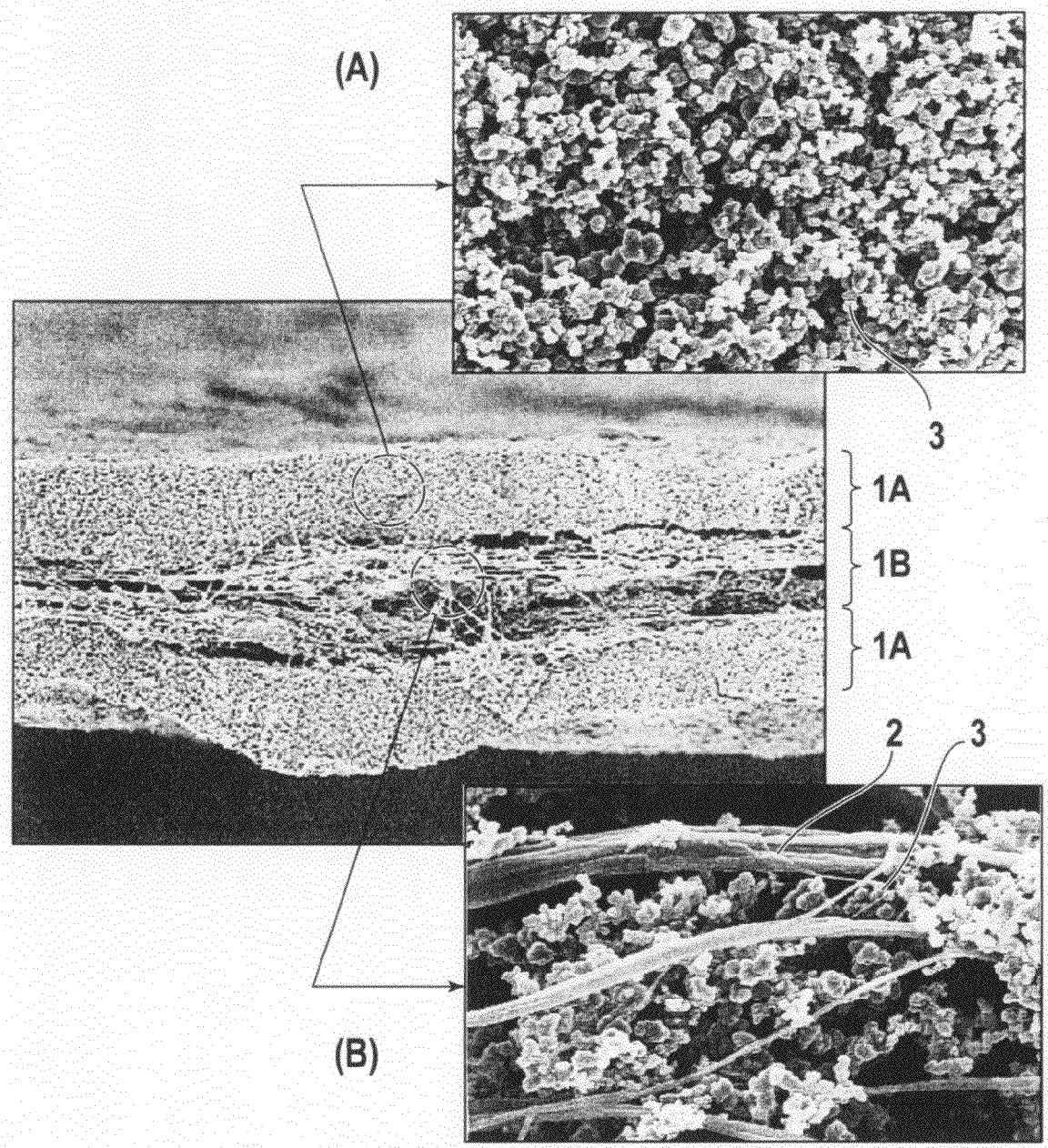
FIG. 2 is electron microscope photographs of an example of the gas diffusion electrode material of the present invention.

A description will be made below in detail of embodiments of a gas diffusion electrode material of the present invention and a production method thereof based on the drawings. Note that, in this specification, "%" denotes a mass percent unless otherwise specified.

The gas diffusion electrode material of the present invention includes: a porous body formed of continuous and discontinuous polytetrafluoroethylene microfibers; and a conductive material supported on the porous body.

The porous body is formed of the polytetrafluoroethylene microfiber, and has three-dimensionally continuous micropores. Then, the conductive material is contained mainly in the three-dimensionally continuous micropores.

Here, the polytetrafluoroethylene (PTFE) fiber is electrically insulative; however, as described above, the conductive material is contained in the porous body made of the PTFE microfiber, whereby conduction routes can be formed in the porous body. Therefore, the porous body becomes one usable as the gas diffusion electrode material, and typically, functions as a porous layer (a mill layer) of a gas diffusion electrode.

Moreover, in the gas diffusion electrode material of the present invention, when a cross section of the above-described porous body is observed, the continuous and discontinuous PTFE microfibers have low-density regions and high-density regions from a front surface region to a back surface region. As a typical distribution (gradient) of the density, for example, the density of the PTFE microfiber can be set so as to be from high to low from the front surface region to the back surface region, and to be from low through high to low and from high through low to high from the front surface region through an intermediate region to the back surface region.

FIG. 1 is electron microscope photographs of the above-described porous body in an example of the gas diffusion electrode material of the present invention: FIG. 1A shows a part of the front surface region of the cross section of the porous body; and FIG. 1B shows a part of the intermediate region thereof. As apparent from FIGS. 1A and 1B, in the intermediate region of a porous body 1, PTFE microfiber 2 is densified more than in the front surface region. Note that, though the cross section in the back surface region of the porous body is not shown in FIG. 1, a state of the cross section in the back surface region is substantially the same as a state of the cross section of the front surface region.

Moreover, in the gas diffusion electrode material of the present invention, when a cross section thereof is observed, a degree of supporting the above-described conductive material can be increased in the region where the density of the PTFE microfiber is low, and the degree of supporting the conductive material can be decreased in the region where the density of the PTFE microfiber is high.

A typical distribution (gradient) of the degree of supporting the conductive material can be set so as to be from low to high (so as to hold the conductive material only on one surface) when the density of the PTFE microfiber is from high to low from the front surface region to the back surface region. Moreover, the distribution of the degree of supporting the conductive material can be set so as to be from high through low to high (so as to hold the conductive material on both surfaces) when the density of the PTFE microfiber is from low through high to low from the front surface region through the intermediate region to the back surface region.

FIG. 2 is electron microscope photographs of an example of a gas diffusion electrode material 10 of the present invention. Here, the photographs are ones obtained by observing a cross section of the gas diffusion electrode material 10 that forms a sheet shape.

As shown in FIG. 2, owing to the density of the PTFE microfiber in the above-described porous body, particles 3 of the conductive material are held more in a front surface region 1A (refer to FIG. 2(A)) of the porous body 1 than in an intermediate region 1B (refer to FIG. 2(B)) thereof.

By the distribution of the conductive material, which is as described above, in the gas diffusion electrode material of the present invention, adhesion on an interface thereof with an electrode catalyst layer becomes good. Therefore, in an area from the electrode catalyst layer on an electrolyte membrane to a support material such as carbon paper, diffusibility and movement of gas and liquid components become suitable ones. Moreover, by the distribution, flooding under a high humidity condition is suppressed. Furthermore, start-stop durability and open circuit voltage (OCV) durability, which are for accelerating the drainage in the electrode catalyst layer, are also enhanced. Still further, movement of water held in the electrolyte membrane under a low humidity condition is also facilitated, and high power generation performance is obtained.

Moreover, by the distribution of the conductive material, which is as described above, in the gas diffusion electrode material of the present invention, adhesion thereof onto the support material is good in the case of using the support material such as the carbon paper, and the gas diffusion electrode material becomes one excellent in durability against external force. Therefore, the gas diffusion electrode material becomes a particularly suitable one to be mounted on an automobile subjected repeatedly to long-time vibrations when an engine starts, the automobile runs, and so on.

Note that, as shown in FIG. 1, the porous body made of the PTFE microfiber, which is used for the gas diffusion electrode material of the present invention, typically has slit-like three-dimensionally (3D) continuous micropores 4.

As will be described later, the 3D continuous micropores are ones caused by a production process of the porous body. By the fact that the porous body has such micropores, the gas diffusion electrode material of the present invention realizes a diffusion electrode structure in which porosity is high, and suppresses the flooding under the high humidity condition. Moreover, since the drainage in the electrode catalyst layer is accelerated, the start-stop durability and the OCV durability are also enhanced. Furthermore, the movement of the water held in the electrolyte membrane under the low humidity condition is also facilitated, the gas diffusion electrode material is able to exert a function that the high power generation performance is obtained.

Moreover, a fiber diameter of the PTFE microfiber is not particularly limited; however, typically, is approximately 0.1 to 5 µm.

Furthermore, it is preferable that, in the gas diffusion electrode material of the present invention, a mass ratio of the polytetrafluoroethylene and the conductive material satisfy a relationship represented by the following Formula (1):

$$(PTFE):(Conductor)=20 \text{ to } 80:80 \text{ to } 20 \quad (1)$$

(where PTFE is the polytetrafluoroethylene, and Conductor is the conductive material).

As described above, the porous body made of the PTFE microfiber is allowed to hold the conductive material, for example, the carbon particles, whereby the conduction routes are formed in the porous body, and the porous body becomes able to function as the mill layer for the gas diffusion electrode. However, on the contrary, when the conductive material is excessively filled into the pores of the porous body, there is a case where gas routes are narrowed to decrease gas permeability. In consideration for this point, it is preferable that the gas diffusion electrode material satisfy the relationship of the above-described Formula (1). Note that, in the above-described Formula (1), when a content of the conductive material is less than 20%, there is a case where the conductivity cannot be ensured sufficiently, and when the content exceeds 80%, there is a case where the gas permeability (diffusibility) and water repellency become insufficient.

Note that, in the gas diffusion electrode material of the present invention, water is less likely to enter an inside thereof and is likely to be drained even if entering the inside since the porous body itself is formed of the PTFE fiber having high water repellency. Hence, such a configuration of the present invention also contributes to moisture removal from the electrode catalyst layer with which the gas diffusion electrode material (the mill layer) will be brought into contact.

Moreover, since the porous body as described above has the 3D continuous micropores, the gas diffusion electrode material of the present invention is also excellent in physical characteristics such as compressive strength, heat resistance and durability.

Here, in general, in the gas diffusion electrode, the slurry containing carbon black and PTFE is applied on the surface of the carbon paper or the carbon cloth, which serves as the support material, followed by heating, whereby the mill layer is formed. In this case, carbon aggregates in the slurry have a size of several 100 nm to 1 μm. Accordingly, a size of the micropores formed in the mill layer after the carbon black is supported is mostly several 100 nm to 1 μm, and porosity in the mill layer also becomes approximately 20 to 50%. Hence, unlike the gas diffusion electrode material of the present invention, in the mill layer of the usual gas diffusion electrode, gas permeability (diffusibility) thereof is insufficient in comparison with that in the support material such as the carbon paper, and further, such moisture removal from the electrode catalyst layer in contact with the mill layer also becomes prone to be insufficient.

Note that there are various forms of the porous bodies, typically, porous membranes; however, one excellent in gas diffusibility and water repellency is suitable for use as a base material of the gas diffusion electrode material.

Moreover, the gas diffusibility of the porous membrane (the porous body) as described above is affected by a membrane thickness thereof, the porosity and the pore diameter. In the present invention, preferably, the thickness is 5 to 50 μm, the porosity is 70% or more, and the pore diameter is 0.5 to 45 μm. In such a way, suitable gas diffusibility can be ensured.

Moreover, in the gas diffusion electrode material of the present invention, which is composed by holding the conductive material on the above-described porous body, preferably, the porosity is 40 to 85%, and the pore diameter is 1 to 30 μm. In order to ensure sufficient gas diffusibility as the gas diffusion electrode material after holding the conductive material in the porous body, it is preferable that the gas diffusion electrode material have the above-described characteristics.

Note that, in the present invention, it is sufficient if the above-described conductive material is particles having electric conductivity; however, typically, it is desirably to use carbon black in which a particle diameter (D50) is 0.5 to 2 μm, preferably, 0.5 to 1.5 μm, and more preferably, 0.9 to 1.0 μm. When the particle diameter is smaller than 0.5 μm, the conductive material sometimes passes through the 3D continuous micropores of the above-described porous body even if the conductive material can enter the same. Meanwhile, when the particle diameter exceeds 2 μm, the conductive material cannot sometimes enter the 3D continuous micropores, and the conduction routes cannot sometimes be formed in the porous body.

Moreover, in order to ensure the water repellency of the gas diffusion electrode for which the carbon black is to be used, preferably, the carbon black is one in which a specific surface area is 30 to 2000 m$^2$/g. In particular, acetylene black or graphitized carbon black is suitable, in which a specific surface area is 30 to 900 m$^2$/g, an average lattice spacing d002 on a (002) plane in X-ray diffraction is 0.343 to 0.362 nm.

Note that, in order to ensure the water repellency of the gas diffusion electrode for which the gas diffusion electrode material of the present invention is to be used, besides the conductive material, components such as a PTFE dispersion as a water-repellent agent can be added to the gas diffusion electrode material.

Moreover, it is preferable that an amount of a solid content including the conductive material and these additional components be set at 0.5 to 3.0 mg/cm$^2$ per unit area of the above-described porous body made of PTFE. When the amount of the solid content is less than 0.5 mg/cm$^2$, the conduction routes are sometimes formed insufficiently, and when the amount of the solid content exceeds 3.0 mg/cm$^2$, the gas diffusibility is sometimes decreased.

Next, a description will be made of another gas diffusion electrode material of the present invention.

This gas diffusion electrode material of the present invention has a substantially similar configuration to that of the above-described gas diffusion electrode material; however, is different therefrom particularly in the following point.

Specifically, this gas diffusion electrode material is composed by allowing the slit-like three dimensionally continuous micropores formed in the porous body to contain at least the conductive material. This porous body is formed of either one or both of continuous microfiber and discontinuous microfiber, which are obtained by uniaxially or biaxially stretching a thin membrane made of polytetrafluoroethylene.

Moreover, in this gas diffusion electrode material, a mass ratio of the polytetrafluoroethylene and the conductive material satisfies a relationship represented by the following Formula (2):

$$(PTFE):(Conductor) = 20\ to\ 60 : 80\ to\ 40 \qquad (2)$$

(where PTFE is the polytetrafluoroethylene, and Conductor is the conductive material).

Here, the porous body made of the polytetrafluoroethylene is a base material that is insulative and has continuous micropores. In order to use this porous body as the gas diffusion electrode material (the porous layer (the mill layer) of the GDL), it is necessary to form the conduction routes by allowing the porous body to contain the conductive material. Meanwhile, when the conductive material is contained in gaps (pores) of the porous body, there is a case where gaps of the base material are filled therewith, and gap routes are narrowed, whereby the gas permeability is significantly decreased.

Therefore, in the present invention, the gas diffusion electrode material is set so as to satisfy the above-described Composition Formula (2), whereby the conductivity, which is provided in the conductive material, and the gas permeability and the water repellency, which are provided in the porous body, are made compatible with each other.

Note that, when a content of the conductive material is less than 40%, the conductivity cannot be ensured sufficiently. Meanwhile, when the content of the conductive material exceeds 80%, the gap routes are narrowed, whereby the gas permeability is prone to be decreased significantly.

Moreover, in order to use the above-described porous body as the base material of the gas diffusion electrode material (the porous layer (the mill layer) of the GDL), it is recommended that the porous body be one having excellent gas diffusibility (gas permeability) and high water repellency. The gas diffusibility can be ensured by adjusting the membrane thickness, the porosity and the pore diameter. For example, it is preferable to use a porous body in which the thickness is 5 to 50 μm, the porosity is 80% or more, the pore diameter is 0.5 to 45 μm, and the gas permeability is 1 to 30 L/min·cm$^2$. For example, one having physical property values equivalent to the above, which is selected from among porous membranes such as Poreflon Membrane (article name; made by Sumitomo Electric Fine Polymer, Inc), can be suitably used.

In this case, good gas diffusibility can be ensured even after carbon particles, in which a particle diameter (D50) is 0.1 μm to 10 μm inclusive (in which a particle diameter of aggregates of primary particles is 10 μm or less), are contained as the conductive material. Note that, since the porous body is made of the polytetrafluoroethylene, the water repellency thereof is high.

Moreover, as the conductive material for forming the conduction routes by being contained in the pores of the porous body, carbon black (including aggregates thereof) can be used, in which a particle diameter (D50) is 0.01 to 2 μm, and a specific surface area is 30 to 2000 m$^2$/g. For example, AB-6 (acetylene black; specific surface area of 40 m$^2$/g; made by Denki Kagaku Kogyo Kabushiki Kaisha) can be suitably used. Use of the conductive material as described above is effective since the conductive material can be dispersed uniformly and highly into the pores.

Note that, when the particle diameter of the conductive material exceeds 2 μm, there is a case where the conductive material particles are hooked on the pores of the porous membrane, and the conduction routes are not formed well. Note that the pores mentioned here do not show a shape in which a round hole is open, but show a shape of a slit-like crack formed in such a manner that a part of the PTFE membrane is torn off.

In such a gas diffusion electrode material, it is suitable that, after the conductive material is supported therein, the porosity be 40 to 80%, the pore diameter be 1 to 30 μm, and the gas permeability be 1 to 20 L/min·cm$^2$, from a viewpoint of ensuring the gas diffusibility.

Moreover, it is desirable that an adhered amount (the amount of solid content) of the conductive material be within a range of 0.3 to 3.0 mg/cm$^2$ per unit area of the polytetrafluoroethylene serving as the base material. When the adhered amount is less than 0.3 mg/cm$^2$, the conduction routes become prone to be formed insufficiently. When the adhered amount exceeds 3.0 mg/cm$^2$, the gas diffusibility is sometimes decreased.

Next, a description will be made of the production method of the gas diffusion electrode material of the present invention.

This production method is a method for producing the above-described gas diffusion electrode material of the present invention, which includes the following steps (1) to (3):

(1) the step of hydrophilizing a porous body formed of continuous and discontinuous polytetrafluoroethylene microfibers and having three-dimensionally continuous micropores;

(2) the step of impregnating and adhering slurry containing a conductive material into and onto the hydrophilized porous body; and (3) the step of performing heat treatment for the porous body onto which the conductive material is adhered.

It is preferable that a polytetrafluoroethylene membrane for use in the step (1) be fabricated by being subjected to uniaxial or biaxial stretching. By such stretching treatment for the PTFE, the slit-like 3D continuous micropores are formed.

Moreover, the step (1) is performed in order to facilitate the subsequent impregnation and adhesion (the step (2)) of the slurry (ink-like aqueous slurry) in consideration for the high water repellency of the PTFE.

Specifically, such a step (1) is performed by allowing surfactant to be contained in the three-dimensionally continuous micropores of the above-described porous body, and filling an organic solvent having hydrophilic groups.

In this case, as the organic solvent, one having hydrophilic groups (typically, hydroxyl groups) and lipophilic groups, for example, alcohol in which a boiling point is 50 to 150° C., is preferable. Ethanol (boiling point: 78.5° C.), propanol (boiling point: 97° C.), butanol (boiling point: 108.1° C.) and hexanol (boiling point: 136° C.) can be mentioned.

Moreover, as the surfactant for use, there can be mentioned Triton X-100 (article name), Naroacty HN-100 (article name), nonionic surfactant (ether type), and the like.

Next, the step (2) is one performed in order to allow conductive particles in the slurry containing the conductive material, typically, carbon particles to enter the 3D continuous micropores of the above-described porous body.

Specifically, the step (2) is performed in the following manner. The above-described slurry is brought into contact with either a front surface or back surface of the above-described porous body, and thereafter, the porous body is pressurized or decompressed, whereby the slurry is impregnated into the inside of the porous body. Subsequently, the surfactant and the organic solvent in the slurry are dried under a normal atmospheric pressure, and the conductive material is fixed to the porous body.

As described above, the hydrophilizing treatment (the step (1)) and the impregnation/adhesion of the slurry (the step (2)) are performed in wet-to-wet fashion, thus making it possible to uniformly impregnate such conductive material-containing slurry into the porous body. In such a way, the adhered amount of the slurry can be controlled within variations of up to ±10% with respect to a target amount.

Moreover, preferably, the hydrophilizing treatment is performed for both surfaces of the porous body in the step (1), and the conductive material containing-slurry is impregnated and adhered into and onto the three-dimensionally continuous micropores of the porous body from both surfaces of the porous body in the step (2). Specifically, the hydrophilizing treatment is performed for one surface of the porous body, and the conductive material-containing slurry is adhered thereonto, and moreover, the hydrophilizing step and the slurry adhering step are performed in similar way also on the other surface. Moreover, the following procedure may be performed, in which the hydrophilizing treatment is performed for both surfaces of the porous body, the conductive material-containing slurry is adhered onto one surface of the porous body, and such a slurry adhering step is then performed in a similar way also for the other surface.

In this case, the conductivity of the porous body containing the conductive material is likely to be enhanced, and can be set at 10 mΩ·cm$^2$ or less. Note that, in the case of only the slurry impregnation from one surface, the polytetrafluoroethylene fiber of the porous body is sometimes exposed to the other surface, resulting in the decrease of the conductivity.

Moreover, the step (3) is one performed in order to fix the conductive material contained in the porous body.

In this step, the porous body is heated up to a temperature equal to or higher than a melting point of the PTFE as the porous body, whereby the conductive material is fixed to the porous body. In usual, the melting point of the PTFE is approximately 320° C., and a melting point of the porous body becomes approximately 300 to 350° C. Hence, it is preferable to perform such heat treatment at 300 to 400° C. When such a heat treatment temperature is lower than 300° C., there is a case where the porous body is not molten, and the conductive material particles cannot be fixed to the porous body. When the heat treatment temperature exceeds 400° C., there is a case where the melting of the porous body advances too much, and deformation such as breakage is caused in the 3D continuous micropores, resulting in the decrease of the gas diffusibility.

Moreover, in the step (3), it is preferable to perform the heat treatment for the porous body, onto which the conductive material is adhered, in a state where tension is applied thereto in a direction parallel to the surface thereof. As described above, when the heat treatment is performed for the porous body made of the PTFE, there is a case where, owing to the melting of the PTFE, a volume of the porous body is shrunken, and the 3D continuous micropores are narrowed. Consequently, the gas diffusibility is sometimes decreased. As opposed to this, when the heat treatment is performed in a state where the tension is applied to the porous body in the direction parallel to the surface direction, for example, in two directions (X-Y directions) perpendicular to each other, such a malfunction can be suppressed.

Note that the heat treatment may be performed while leaving the porous body fixed to formworks besides applying the tension thereto.

Figure 5:
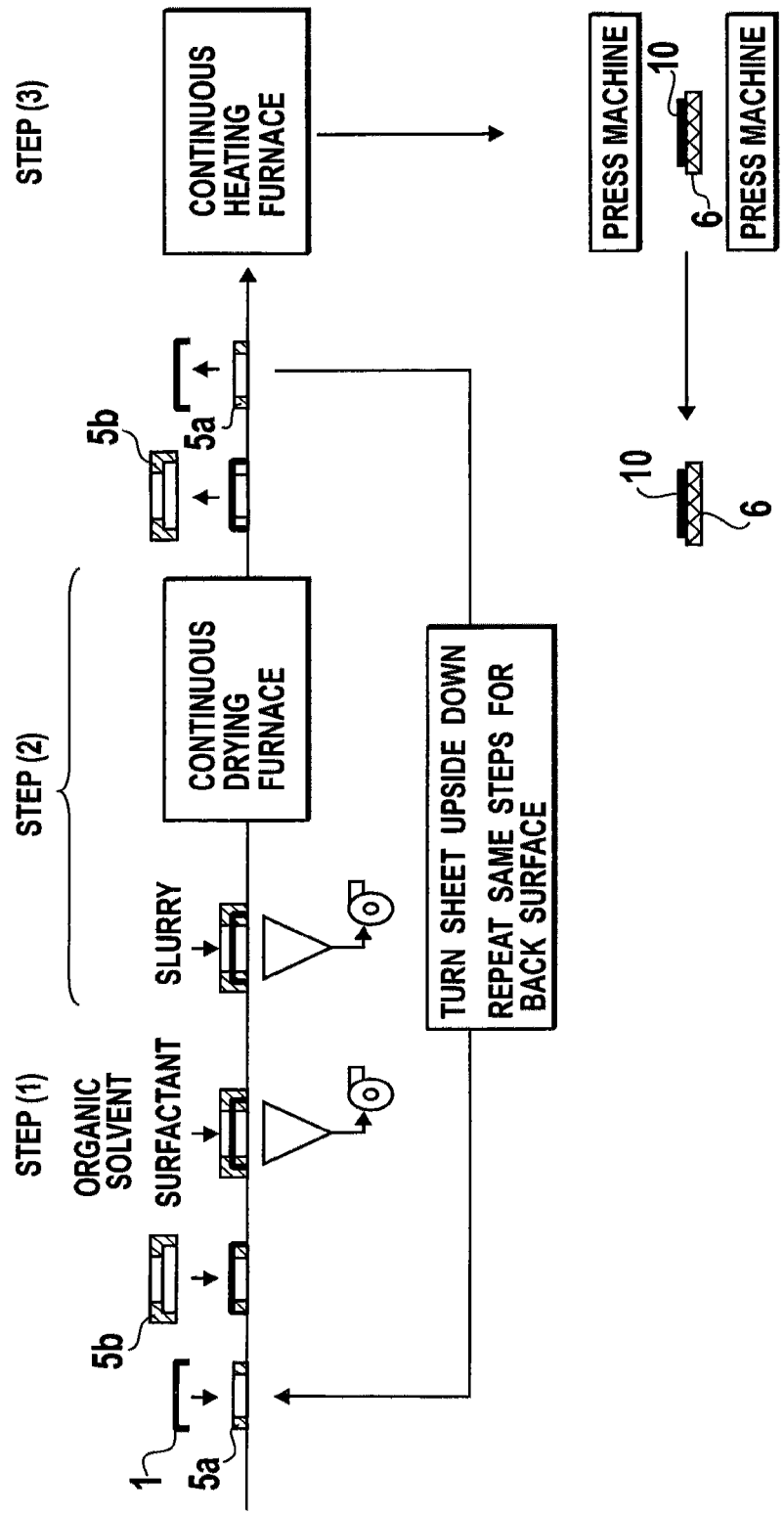
FIG. 5 is a process flowchart showing an example of a production method of the gas diffusion electrode material of the present invention.

FIG. 5 shows an example of a process flow of manufacturing the gas diffusion electrode using the gas diffusion electrode material of the present invention through the above-described steps (1) to (3). In this process flow, first, the porous body (the porous PTFE sheet) 1 is fixed by formworks 5a and 5b. Thereafter, the porous body 1 is allowed to contain the surfactant, is filled with the organic solvent, and is decompressed from a lower surface thereof, whereby the hydrophilizing treatment is performed therefor (the step (1)). Moreover, after the step (1), the conductive material-containing slurry is applied on the hydrophilized porous body. Thereafter, the porous body 1 is decompressed from the lower surface thereof, whereby the above-described slurry is impregnated into the inside of the porous body 1. Thereafter, the porous body 1 is dried under the normal atmospheric pressure in a continuous drying furnace, whereby the conductive material is adhered onto the porous body (the step (2)). After the step (2), the formworks 5a and 5b are detached from the porous body 1 on which the conductive material is adhered, and the porous body 1 is subjected to the heat treatment in a continuous heating furnace, whereby the conductive material is fixed to the porous body 1 (the step (3)). After the step (3), the completed gas diffusion electrode material is put into a press machine together with a support material 6, and the gas diffusion electrode material and the support material are bonded to each other, followed by cutting, whereby the gas diffusion electrode can be obtained. Note that, after the step (1) and the step (2) are performed, the porous body 1 is turned upside down, and the same steps are repeatedly performed for the back surface, whereby the conductive material is impregnated/adhered into/onto the porous body 1 from both surfaces thereof. In such a way, the gas diffusion electrode material can be manufactured.

Next, a description will be made of the electrode catalyst layer of the gas diffusion electrode of the present invention.

The electrode catalyst layer of the present invention is one composed by supporting an electrode catalyst on the above-described gas diffusion electrode material of the present invention.

As such an electrode catalyst, there can be mentioned catalysts in which the following active components are supported on a conductive material (a carbon support). The active components are such as: platinum (Pt), palladium (Pd), rhodium (Rh), iridium (Ir), ruthenium (Ru), or Pt alloys containing mixtures of theses; and cobalt (Co), iron (Fe), nickel (Ni), chromium (Cr), manganese (Mn), or Pt alloys containing mixtures of these.

Next, a description will be made of the gas diffusion electrode of the present invention.

As shown in FIG. 5, the gas diffusion electrode of the present invention is composed by supporting the above-described gas diffusion electrode material or electrode catalyst layer of the present invention by the gas-permeable conductive support material 6 such as the carbon paper and the carbon cloth.

The gas diffusion electrode material of the present invention can be directly used as the gas diffusion electrode; however, if the gas diffusion electrode material is supported by the carbon paper and the like, then rigidity thereof can be enhanced, and handling easiness thereof can be further enhanced.

As such a conductive support material, one with a thickness of 100 to 300 μm is preferable. When the thickness is less than 100 μm, strength thereof sometimes becomes insufficient, and when the thickness exceeds 300 μm, the gas diffusibility is sometimes inhibited.

Moreover, it is sufficient if the carbon paper and the carbon cloth have conductivity, and graphitization degrees thereof may be low.

Note that, though water repellent treatment is performed for the carbon paper and the carbon cloth in the conventional gas diffusion electrode, such water repellent treatment is unnecessary in the present invention. The carbon paper and the like are sometimes deteriorated following a time deterioration of a water repellent for use in the water repellent treatment, and accordingly, it is recommended that the water repellent treatment would not rather be performed in the present invention.

Figure 6:
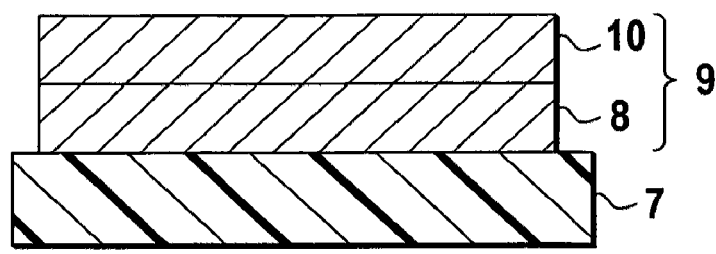
FIG. 6 is a schematic cross-sectional view showing an example of a gas diffusion electrode using the gas diffusion electrode material of the present invention.

It is as described above that the gas diffusion electrode material of the present invention can be used as the gas diffusion layer even if being left fixed to the support material such as the carbon paper and the carbon cloth. Moreover, as shown in FIG. 6, in the case where a gas diffusion electrode 9 is composed by supporting the gas diffusion electrode material 10 of the present invention on an electrode catalyst layer 8 provided on an electrolyte membrane 7, adhesion between the electrode catalyst layer 8 and the gas diffusion electrode material 10 can be enhanced, contact resistance therebetween can be reduced, and the power generation performance of the gas diffusion electrode material can be further enhanced.

A description will be made below more in detail of the present invention by examples and comparative examples; however, the present invention is not limited to these examples.

Example 1

Fabrication procedures of the gas diffusion electrode material and the MEA will be described below.

[Fabrication of Gas Diffusion Electrode]

1. Preparation of Polytetrafluoroethylene Porous Membrane

A base material with a size of 10 cm square was cut out of the slit-like polytetrafluoroethylene porous membrane sheet shown in FIG. 1, in which the thickness was 30 μm, the pore diameter ranged from 0.5 to 45 μm (the average pore diameter: 15 elm), and the porosity was 88%.

2. Preparation of Hydrophilizing Treatment Solution 4 g of the surfactant (Triton X-100 made by The Dow Chemical Company) and 200 g of ethanol were mixed together, and a resultant solution was subjected to stirring/dispersion treatment for 30 minutes at 150 rpm in a propeller stirrer, and was formed into a hydrophilizing treatment solution.

3. Preparation of Coating Ink Slurry 3 g of the surfactant (Triton X-100 made by The Dow Chemical Company) and 200 g of pure water were mixed together, and a resultant solution was subjected to stirring treatment for 30 minutes at 150 rpm in the propeller stirrer. Thereafter, 20 g of the acetylene black (AB-6) made by Denki Kagaku Kogyo Kabushiki Kaisha was put into and mixed with the above-described surfactant-dispersed solution, and a resultant mixture was subjected to stirring treatment for 30 minutes at 150 rpm in the propeller stirrer.

The above-described ink slurry was subjected to milling treatment by using a jet mill, and an average particle diameter of carbon thereof was set at 1 μm. 3 g of Polyflon D-1E (solid content: 64%) made by Daikin Industries, Ltd. was put into and mixed with the above-described ink slurry. Then, a resultant mixture was subjected to stirring treatment for 30 minutes at 150 rpm in the propeller stirrer, whereby coating ink slurry was formed.

4. Hydrophilizing Treatment (1)

The base material cut out into the size of 10 cm square was fixed to a stainless steel-made jig in which a hollow portion had a size of 8 cm square, and was placed on a decompression/suction plate. 25 ml of the hydrophilizing treatment solution was immersed entirely into one surface of the base material, and was decompressed and sucked, whereby the hydrophilizing treatment solution was impregnated into the base material. Subsequently, such a decompression/suction operation was stopped in a state where the hydrophilizing treatment solution was impregnated sufficiently into the base material, whereby a state was brought, in which the hydrophilizing treatment solution was filled into the base material.

5. Coating Treatment (1)

In the state where the hydrophilizing treatment solution was filled into the base material, 15 ml of the above-described prepared coating ink slurry was immersed into the base material, followed by decompression and suction, whereby the coating ink slurry was impregnated into the base material while being substituted for the hydrophilizing treatment solution in the base material. After the ink slurry was sufficiently impregnated, a resultant of the above was dried for 15 minutes in a drying furnace (at the air atmosphere) at 80° C. In such a way, a base material a1 of which one surface was subjected to the treatment was obtained.

6. Hydrophilizing Treatment (2)

Next, in order to treat an untreated surface of the base material a1, the base material a1 was fixed to the stainless steel-made jig in which the hollow portion had a size of 8 cm square, and was placed on the decompression/suction plate in a similar manner to the above. 25 ml of the hydrophilizing treatment solution was immersed entirely into the other surface of the base material, followed by decompression and suction, whereby the hydrophilizing treatment solution was impregnated into the base material.

Subsequently, such a decompression/suction operation was stopped in a state where the hydrophilizing treatment solution was impregnated sufficiently into the base material, whereby a state was brought, in which the hydrophilizing treatment solution was filled into the base material.

7. Coating Treatment (2)

In the state where the hydrophilizing treatment solution was filled into the base material, 15 ml of the above-described prepared coating ink slurry was immersed into the base material, followed by decompression and suction, whereby the coating ink slurry was impregnated into the base material while being substituted for the hydrophilizing treatment solution in the base material. After the ink slurry was sufficiently impregnated, a resultant of the above was dried for 15 minutes in the drying furnace (at the air atmosphere) at 80° C. In such a way, a base material a2 of which both surfaces were subjected to the treatment was obtained. A total coated amount of a solid content of the ink slurry on the base material a2 was 1.0 mg/cm$^2$.

8. Heating of Porous Membrane

The base material a2 in which the ink slurry was coated on both surfaces was subjected to heat treatment for 10 minutes in a heating furnace (at the air atmosphere) at 350° C., and PTFE-dispersed particles contained in the base material and the PTFE fiber of skeletons thereof were molten together. In such a way, the PTFE was dispersed onto the carbon particles contained in the base material, and the gas diffusion electrode material was formed. In such a way, the gas diffusion electrode material A1 shown in FIG. 2 was obtained, in which the mass ratio of (PTFE):(Conductor) was equal to 30:70, and the porosity was 70%.

9. Bonding of Carbon Paper

The above-described gas diffusion electrode material A1 was set on carbon paper named TGP-H-060 made by Toray Industries, Inc., which had a size of 10 cm square, and the gas diffusion electrode material and the carbon paper were subjected to bonding treatment for three minutes at 130° C. and 2 MPa by hot press.

A bonded body of the carbon paper and the gas diffusion electrode material A1, which was thus obtained, was cut out into a predetermined size (6.0 cm×5.5 cm), and a gas diffusion electrode G1 was formed.

[Fabrication of Membrane Electrode Assembly (MEA)]

1. Preparation of Anode Electrode Catalyst

As the conductive carbon material, 4.0 g of carbon black (Ketjen Black™ EC made by Ketjen Black International Company, BET specific surface area: 800 m$^2$/g) was prepared. To this conductive carbon material, added was 400 g of a dinitrodiammine platinum solution (Pt concentration: 1.0%), and a resultant solution was stirred for one hour. Moreover, 50 g of methanol was mixed as a reducing agent to the solution, and a resultant solution was stirred for one hour. Thereafter, the solution was heated up to 80° C. for 30 minutes, was stirred at 80° C. for six hours, and was then cooled down to room temperature for one hour.

After a deposition was filtered, a solid material thus obtained was dried at 85° C. under a reduced pressure for 12 hours, and was milled in a mortar, whereby an anode electrode catalyst (average particle diameter of Pt particles: 2.6 nm; supported concentration of Pt: 50 mass %) was obtained.

2. Preparation of Cathode Electrode Catalyst

The carbon black (Ketjen Black™ EC made by Ketjen Black International Company) was subjected to heat treatment, whereby carbon black (graphitized Ketjen Black EC, BET specific surface area: 130 m²/g) subjected to graphitization treatment was obtained. 400 g of a dinitrodiammine platinum solution (Pt concentration: 1.0%) was added to 4.0 g of the Ketjen Black thus subjected to the graphitization treatment, and a resultant solution was stirred for one hour. Moreover, 50 g of formic acid was mixed as a reducing agent to the solution, and a resultant solution was stirred for one hour. Thereafter, the solution was heated up to 40° C. for 30 minutes, and was stirred at 40° C. for six hours. Moreover, the solution was heated up to 60° C. for 30 minutes, further, was stirred at 60° C. for six hours, and was then cooled down to the room temperature for one hour. After a deposition was filtered, a solid material thus obtained was dried at 85° C. under a reduced pressure for 12 hours, and was milled in the mortar, whereby a cathode electrode catalyst (average particle diameter of Pt particles: 4.8 nm; supported concentration of Pt: 50 mass %) was obtained.

3. Fabrication of Anode Catalyst Layer

Purified water of which amount was five times a mass of the anode electrode catalyst was added thereto, and a resultant solution was subjected to a decompression/deaerating operation for five minutes. n-propyl alcohol of which amount was 0.5 time an amount of the solution was added thereto, and further, a solution (containing 20% Nafion made by DuPont Corporation) containing a proton-conductive polymer electrolyte was added thereto. As the polymer electrolyte in the solution, one was used, in which a solid mass ratio of a content with respect to the carbon of the anode electrode catalyst, that is, Carbon/Ionomer was equal to 1.0/0.9.

Mixed slurry thus obtained was dispersed well by an ultrasonic homogenizer, and was subjected to the decompression/deaerating operation, whereby catalyst slurry was prepared. This catalyst slurry of which amount corresponded to the desired thickness was printed on one surface of a polytetrafluoroethylene sheet by a screen printing method, and was dried at 60° C. for 24 hours. A size of the formed anode catalyst layer was set at 5 cm×5 cm. Moreover, the coated layer on the polytetrafluoroethylene sheet was adjusted so that an amount of Pt could be 0.2 mg/cm (average thickness of the anode catalyst layer: 6 μm).

4. Fabrication of Cathode Catalyst Layer

Purified water of which amount was five times a mass of the cathode electrode catalyst was added thereto, and a resultant solution was subjected to the decompression/deaerating operation for five minutes. n-propyl alcohol of which amount was 0.5 time an amount of the solution was added thereto, and further, a solution (containing 20% Nafion made by DuPont Corporation) containing the proton-conductive polymer electrolyte was added thereto. As the polymer electrolyte in the solution, one was used, in which a solid mass ratio of a content with respect to the carbon of the cathode electrode catalyst, that is, Carbon/Ionomer was equal to 1.0/0.9.

Mixed slurry thus obtained was dispersed well by the ultrasonic homogenizer, and was subjected to the decompression/deaerating operation, whereby catalyst slurry was prepared. This catalyst slurry of which amount corresponded to the desired thickness was printed on the other surface of the polytetrafluoroethylene sheet by the screen printing method, and was dried at 60° C. for 24 hours. A size of the formed cathode catalyst layer was set at 5 cm×5 cm. Moreover, the coated layer on the polytetrafluoroethylene sheet was adjusted so that an amount of Pt could be 0.4 mg/cm² (average thickness of the cathode catalyst layer: 12 g/m).

5. Fabrication of Membrane Electrode Assembly (MEA)

Nafion™ NRE211 (the former NE111) (membrane thickness: 25 μm), which served as a solid polymer electrolyte membrane, and the electrode catalyst layers formed on the polytetrafluoroethylene sheets, which were fabricated in advance, were superposed on one another. In this case, the anode catalyst layer, the solid polymer electrolyte membrane and the cathode catalyst layer were stacked on one another in this order. Thereafter, this body thus stacked was hot-pressed at 130° C. and 2.0 MPa for 10 minutes, and only the polytetrafluoroethylene sheets were peeled therefrom, whereby an MEA was obtained.

With regard to the cathode catalyst layer transferred onto the solid polymer electrolyte membrane, the thickness was approximately 12 μm, the supported amount of Pt was 0.4 mg per 1 cm² of an apparent electrode area, and the electrode area was 25 cm². With regard to the anode catalyst layer, the thickness was approximately 6 μm, the supported amount of Pt was 0.2 mg per 1 cm² of an apparent electrode area, and the electrode area was 25 cm.

[Performance Evaluation of Membrane Electrode Assembly (MEA)]

Figure 7:
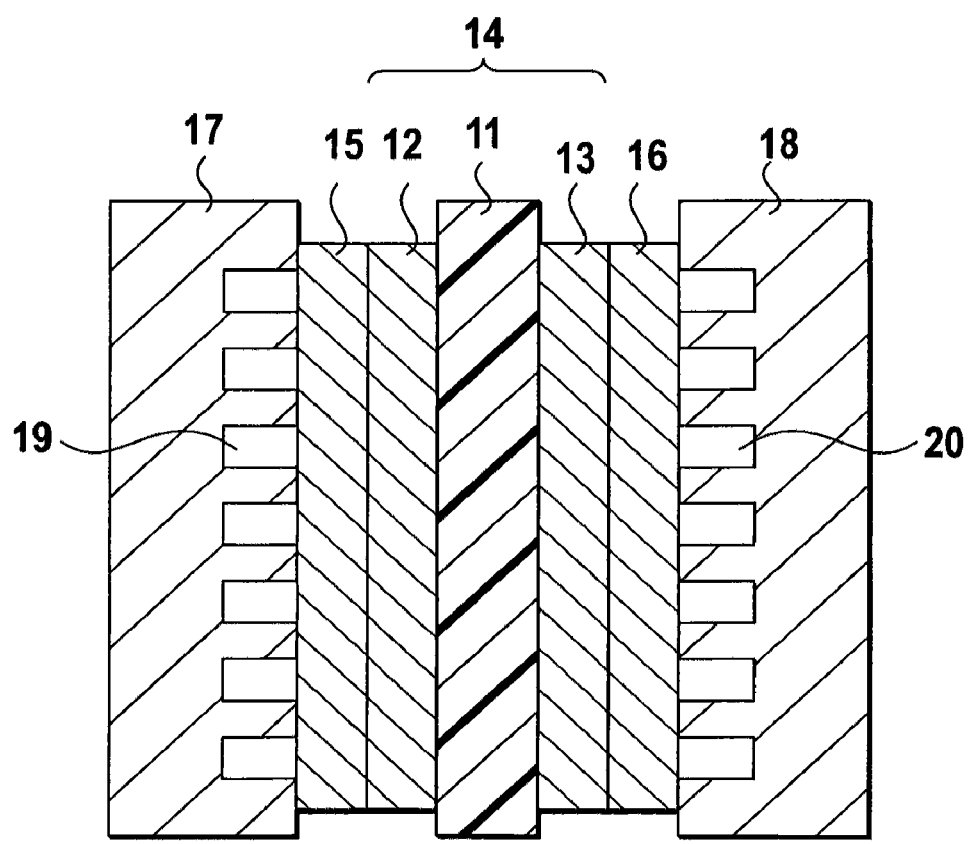
FIG. 7 is a schematic cross-sectional view showing an example of a single cell using the gas diffusion electrode material of the present invention.

As shown in FIG. 7, the gas diffusion electrodes G1 (size: 6.0 cm×5.5 cm) obtained in the above description and gas separators 17 and 18 added with gas flow passages were arranged on both surfaces of the MEA 14 obtained in the above description. Moreover, such a body thus obtained was sandwiched by stainless steel-made current collectors (not shown) subjected to gold plating, whereby a single cell as an objective of evaluation was formed. Note that, in FIG. 7, reference numeral 11 denotes the solid polymer electrolyte membrane, reference numeral 12 denotes the anode catalyst layer, reference numeral 13 denotes the cathode catalyst layer, reference numerals 15 and 16 denote the gas diffusion electrodes, reference numeral 17 denotes the anode-side separator, reference numeral 18 denotes the cathode-side separator, reference numeral 19 denotes the fuel gas flow passage, and reference numeral 20 denotes the oxidizing agent gas flow passage.

Next, hydrogen was supplied as fuel to the anode side of the single cell as the objective of evaluation, and air was supplied as the oxidizing agent to the cathode side thereof. Supply pressures of both of the gases were set at the atmospheric pressure. With regard to the hydrogen, a temperature was set at 58.6° C., and a relative humidity was set at 60%. With regard to the air, a temperature was set at 54.8° C., and a relative humidity was set at 50%. A cell temperature was set at 70° C. Moreover, a utilization ratio of the hydrogen was set at 67%, and a utilization ratio of the air was set at 40%. A cell voltage in the case of generating power at a current density of 1.0 A/cm under such conditions was measured as an initial cell voltage.

Subsequently, after the power was generated for 60 seconds, this power generation was stopped. After the power generation was stopped, the supply of the hydrogen and the air was stopped, substitution was performed for the single cell by using the air, and the single cell was made to be on standby for 50 seconds. Thereafter, the hydrogen gas was supplied to the anode side for 10 seconds at a utilization ratio of 1/5 of the above-described utilization ratio. Thereafter, the hydrogen gas and the air were supplied to the anode side and the cathode side, respectively, under similar conditions to those of the above description, and the power was generated again for 60 seconds at a current density of 1.0 A/cm². Moreover, a load current at this time was increased from 0 A/cm² to 1 A/cm² for 30 seconds. Such power generation/stop operations were implemented, and the cell voltage was measured, whereby the power generation performance was evaluated. The number of cycles at the point of time when the cell voltage at the current density of 1.0 A/cm² became 0.45 V was used as an evaluation value of the durability. Configurations and results are shown in FIG. 8A and FIG. 8B.

Example 2

In a similar way to Example 1, gas diffusion electrodes G2 were obtained, which supported a gas diffusion electrode material in which a coated amount was 1.0 mg/cm², a mass ratio of (PTFE):(Conductor) was equal to 20:80, and a porosity was 72%.

Example 3

In a similar way to Example 1, gas diffusion electrodes G3 were obtained, which supported a gas diffusion electrode material in which a coated amount was 1.0 mg/cm², a mass ratio of (PTFE):(Conductor) was equal to 40:60, and a porosity was 70%.

Example 4

In a similar way to Example 1, gas diffusion electrodes G4 were obtained, which supported a gas diffusion electrode material in which a coated amount was 1.0 mg/cm², a mass ratio of (PTFE):(Conductor) was equal to 50:50, and a porosity was 70%.

Example 5

In a similar way to Example 1, gas diffusion electrodes G5 were obtained, which supported a gas diffusion electrode material in which a coated amount was 1.0 mg/cm², a mass ratio of (PTFE):(Conductor) was equal to 70:30, and a porosity was 69%.

Example 6

In a similar way to Example 1, gas diffusion electrodes G6 were obtained, which supported a gas diffusion electrode material in which a coated amount was 0.5 mg/cm², a mass ratio of (PTFE):(Conductor) was equal to 30:70, and a porosity was 80%.

Example 7

In a similar way to Example 1, gas diffusion electrodes G7 were obtained, which supported a gas diffusion electrode material in which a coated amount was 0.5 mg/cm², a mass ratio of (PTFE):(Conductor) was equal to 50:50, and a porosity was 78%.

Example 8

In a similar way to Example 1, gas diffusion electrodes G8 were obtained, which supported a gas diffusion electrode material in which a coated amount was 1.5 mg/cm², a mass ratio of (PTFE):(Conductor) was equal to 30:70, and a porosity was 63%.

Example 9

In a similar way to Example 1, gas diffusion electrodes G9 were obtained, which supported a gas diffusion electrode material in which a coated amount was 1.5 mg/cm², a mass ratio of (PTFE):(Conductor) was equal to 50:50, and a porosity was 62%.

Example 10

In a similar way to Example 1, gas diffusion electrodes G10 were obtained, which supported a gas diffusion electrode material in which a coated amount was 2.0 mg/cm², a mass ratio of (PTFE):(Conductor) was equal to 30:70, and a porosity was 54%.

Example 11

1. Preparation of Cathode Electrode Catalyst

As the conductive carbon material, 4.0 g of carbon black (Ketjen Black™ EC made by Ketjen Black International Company, BET specific surface area: 800 m²/g) was prepared. To this conductive carbon material, added was 400 g of a dinitrodiammine platinum solution (Pt concentration: 1.0%), and a resultant solution was stirred for one hour. Moreover, 50 g of methanol was mixed as a reducing agent to the solution, and a resultant solution was stirred for one hour. Thereafter, the solution was heated up to 80° C. for 30 minutes, was stirred at 80° C. for six hours, and was then cooled down to the room temperature for one hour. After a deposition was filtered, a solid material thus obtained was dried at 85° C. under a reduced pressure for 12 hours, and was milled in the mortar, whereby a cathode electrode catalyst (average particle diameter of Pt particles: 2.6 nm; supported concentration of Pt: 50 mass %) was obtained.

2. Fabrication of Cathode Catalyst Layer

Purified water of which amount was five times a mass of the cathode electrode catalyst was added thereto, and a resultant solution was subjected to the decompression/deaerating operation for five minutes. n-propyl alcohol of which amount was 0.5 time an amount of the solution was added thereto, and further, a solution (containing 20% Nafion made by DuPont Corporation) containing a proton-conductive polymer electrolyte was added thereto. As the polymer electrolyte in the solution, one was used, in which a solid mass ratio of a content with respect to the carbon of the cathode electrode catalyst, that is, Carbon/Ionomer was equal to 1.0/0.9.

Mixed slurry thus obtained was dispersed well by the ultrasonic homogenizer, and was subjected to the decompression/deaerating operation, whereby catalyst slurry was prepared. This catalyst slurry of which amount corresponded to the desired thickness was printed on one surface of a polytetrafluoroethylene sheet by the screen printing method, and was dried at 60° C. for 24 hours. A size of the formed cathode catalyst layer was set at 5 cm×5 cm. Moreover, the coated layer on the polytetrafluoroethylene sheet was adjusted so that an amount of Pt could be 0.4 mg/cm² (average thickness of the cathode catalyst layer: 12 μm).

3. Fabrication of Membrane Electrode Assembly (MEA)

The Nafion™ NRE211 (the former NE111) (membrane thickness: 25 μm), which served as a solid polymer electrolyte membrane, and the anode electrode catalyst layer fabricated in Example 1 and the above-described cathode electrode catalyst layer were superposed on one another. In this case, the anode catalyst layer, the solid polymer electrolyte membrane and the cathode catalyst layer were stacked on one another in this order. Thereafter, this body thus stacked was hot-pressed at 130° C. and 2.0 MPa for 10 minutes, and only the polytetrafluoroethylene sheets were peeled therefrom, whereby an MEA was obtained.

With regard to the cathode catalyst layer transferred onto the solid polymer electrolyte membrane, the thickness was approximately 12 μm, the supported amount of Pt was 0.4 mg per 1 cm$^2$ of an apparent electrode area, and the electrode area was 25 cm$^2$. With regard to the anode catalyst layer, the thickness was approximately 6 μm, the supported amount of Pt was 0.2 mg per 1 cm$^2$ of an apparent electrode area, and the electrode area was 25 cm$^2$.

This MEA was combined with the gas diffusion electrodes G1 fabricated in Example 1, and evaluation was performed therefor.

Example 12

An MEA was evaluated in a similar way to Example 1 except for using carbon black (Vulcan XC-72) made by Cabot Corporation in place of the acetylene black (AB-6) made by Denki Kagaku Kogyo Kabushiki Kaisha in the case of fabricating the gas diffusion electrode material of Example 1.

Example 13

An MEA was evaluated in a similar way to Example 1 except for using the carbon black (Ketjen Black™ EC) made by Ketjen Black International Company in place of the acetylene black (AB-6) made by Denki Kagaku Kogyo Kabushiki Kaisha in the case of fabricating the gas diffusion electrode material of Example 1.

Example 14

An MEA was evaluated in a similar way to Example 1 except for using the graphitized Ketjen Black in place of the acetylene black (AB-6) made by Denki Kagaku Kogyo Kabushiki Kaisha in the case of fabricating the gas diffusion electrode material of Example 1.

Example 15

The gas diffusion electrode materials A1 fabricated in Example 1 were cut out into a predetermined size (6.0 cm×5.5 cm), and were superposed on both surfaces of the MEA fabricated in advance in Example 1.

In this case, the gas diffusion electrode material A1, the MEA (one formed by stacking and bonding the anode catalyst layer, the solid polymer electrolyte membrane and the cathode catalyst layer in this order) and the gas diffusion electrode material A1 were stacked on one another in this order.

Thereafter, this body thus stacked was subjected to the bonding treatment for three minutes at 130° C. and 2 MPa by the hot press. Pieces of the carbon paper (6.0 cm×5.5 cm) were superposed on one thus obtained, in which the gas diffusion electrode materials were arranged on both sides of the MEA. Then, such a body thus obtained was used for the evaluation.

Comparative Example 1

3 g of the surfactant (Triton X-100 made by The Dow Chemical Company) and 200 g of the pure water were mixed together, and a resultant solution was subjected to the stirring treatment for 30 minutes at 150 rpm in the propeller stirrer. Thereafter, 20 g of the acetylene black (AB-6) made by Denki Kagaku Kogyo Kabushiki Kaisha was put into and mixed with the above-described surfactant-dispersed solution, and a resultant mixture was subjected to the stirring treatment for 30 minutes at 150 rpm in the propeller stirrer.

The above-described ink slurry was subjected to the milling treatment by using the jet mill, and an average particle diameter of carbon thereof was set at 1 μm. 15 g of the Polyflon D-1E (solid content: 64%) made by Daikin Industries, Ltd. was put into and mixed with the above-described ink slurry. Then, a resultant mixture was subjected to the stirring treatment for 30 minutes at 150 rpm in the propeller stirrer, and further, was subjected to the decompression/de-aerating operation, whereby slurry was obtained.

This slurry of which amount corresponded to the desired thickness was printed by the screen printing method on one surface of the carbon paper named TGP-H060 made by Toray Industries, Inc., which had a size of 10 cm square, and was dried at 80° C. for 24 hours. Thereafter, the slurry and the carbon paper were subjected to the heat treatment for 30 minutes in the heating furnace (at the air atmosphere) at 350° C., and the PTFE-dispersed particles in the slurry were molten, and were dispersed onto the carbon particles, whereby the gas diffusion electrode material was formed. In such a way, a gas diffusion electrode g1 was obtained, which had a gas diffusion layer (a porous layer (a mill layer)) in which a coated amount was 2.0 mg/cm$^2$, a mass ratio of (PTFE):(Conductor) was equal to 30:70, and a porosity was 40%.

Bonded bodies of the gas diffusion electrodes g1 thus obtained were cut out into a predetermined size (6.0 cm×5.5 cm), were combined with the MEA of Example 1, and evaluation was performed therefor.

Comparative Example 2

As shown in FIG. 3, a base material with a size of 10 cm square was cut out of a polytetrafluoroethylene porous membrane sheet in which a thickness was 50 μm, a pore diameter ranged from 0.5 to 45 μm (an average pore diameter: 15 μm), and a porosity was 60%. Incidentally, FIG. 3A shows a surface region of the porous membrane, and FIG. 3B shows an intermediate region thereof.

In a similar way to Example 1, this polytetrafluoroethylene porous membrane sheet was allowed to contain the ink slurry, whereby a gas diffusion electrode material was fabricated.

Figure 4:
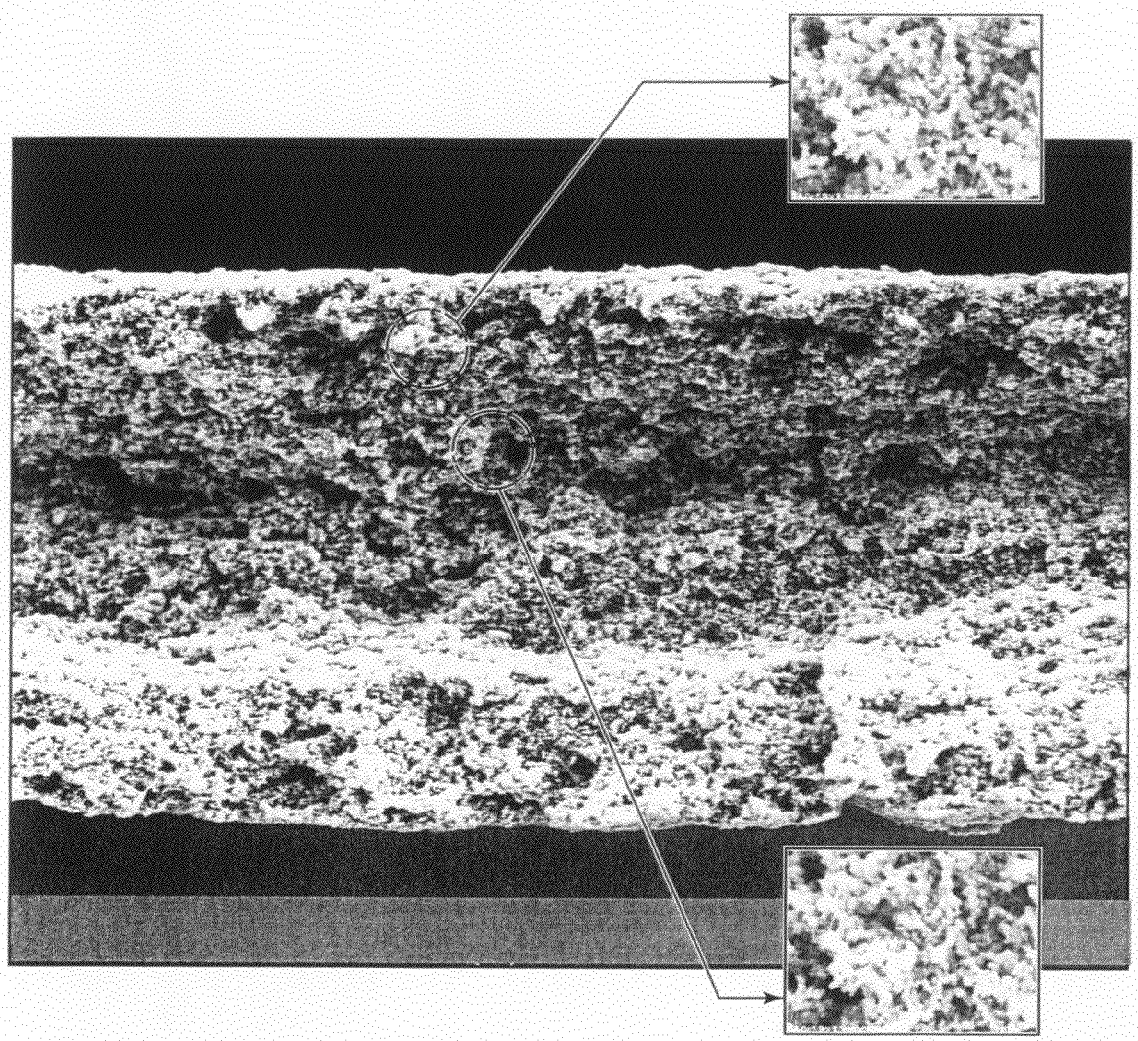
FIG. 4 is electron microscope photographs of the conventional gas diffusion electrode material.

In a similar way to Example 1, gas diffusion electrodes G16 were obtained, which supported the gas diffusion electrode material in which a coated amount was 1.0 mg/cm$^2$, a mass ratio of (PTFE):(Conductor) was equal to 30:70, and a porosity was 40%. FIG. 4 shows photographs of a cross section of the gas diffusion electrode G16.

Comparative Example 3

The gas diffusion electrodes G16 of Comparative example 2 were combined with the MEA fabricated in Example 11, and evaluation was performed therefor.

Example 16

Fabrication of Gas Diffusion Electrode

1. Preparation of Polytetrafluoroethylene Porous Membrane

A PTFE porous thin membrane with an average particle diameter of 10 μm and a thickness of 50 μm was cut to a square of 10 cm.

2. Preparation of Hydrophilizing Treatment Solution 5 g of the surfactant (Triton X-100 made by The Dow Chemical Company) and 200 g of ethanol were mixed together, and a resultant solution was subjected to stirring/ dispersion treatment for 30 minutes at 150 rpm in the propeller stirrer, and was formed into a hydrophilizing treatment solution.

3. Preparation of Coating Ink Slurry 3 g of the surfactant (Triton X-100 made by The Dow Chemical Company) and 200 g of pure water were mixed together, and a resultant solution was subjected to stirring treatment for 30 minutes at 150 rpm in the propeller stirrer. Thereafter, 20 g of carbon black (Vulcan XC-72R made by Cabot Corporation) was put into and mixed with the above-described surfactant-dispersed solution, and a resultant mixture was subjected to stirring treatment for 30 minutes at 150 rpm in the propeller stirrer.

The above-described ink slurry was subjected to milling treatment by using the jet mill, and an average particle diameter of carbon thereof was set at 1 µm. 13 g of the Polyflon D-1E made by Daikin Industries, Ltd. was put into and mixed with the above-described ink slurry. Then, a resultant mixture was subjected to stirring treatment for 30 minutes at 150 rpm in the propeller stirrer, whereby coating ink slurry was formed.

4. Hydrophilizing Treatment of PTFE Porous Membrane

The PTFE porous membrane prepared in Step 1 was fixed to the stainless steel-made jig in which a hollow portion had a size of 8 cm square, and was immersed into the hydrophilizing treatment solution prepared in Step 2, followed by decompression and suction.

5. Coating of Ink Slurry

Before being completely dried, the PTFE porous membrane subjected to the hydrophilizing treatment in Step 4 was immersed into the ink slurry prepared in Step 3, followed by decompression and suction, and was dried in the drying furnace at 70 to 100° C.

6. Heating of PTFE Porous Membrane

The PTFE porous membrane on which the ink slurry was coated in Step 5 was subjected to heating treatment for 20 minutes in the heating furnace at 320° C., whereby a gas diffusion electrode material was formed.

Note that, in the obtained gas diffusion electrode material, the mass ratio of (PTFE):(Conductor) was equal to 30:70.

7. Bonding of PTFE Porous Membrane

The above-described gas diffusion electrode material was set on carbon paper (TGP-H-060 made by Toray Industries, Inc.) with a size of 10 cm square, and the gas diffusion electrode material and the carbon paper were subjected to boding treatment by the hot press.

8. Cutting of Gas Diffusion Electrode

A set of the carbon paper and the gas diffusion electrode material, which was obtained in Step 7, was cut out to a predetermined size, whereby a gas diffusion electrode was formed.

Evaluation of Gas Diffusion Electrode

As shown in FIG. 7, the membrane electrode assembly (MEA) 14 sandwiched by such obtained gas diffusion electrodes 15 and 16 was sandwiched by the separator 17 having the gas flow passage 19 and by the separator 18 having the oxidizing agent gas flow passage 20, whereby a single cell of a fuel cell was assembled.

Under the atmospheric pressure, the hydrogen gas and the air were introduced into the anode electrode and the cathode electrode, respectively. Then, the single cell was subjected to aging treatment for three hours at a cell temperature of 70° C. and a load current density of 1 A/cm$^2$. Thereafter, power generation performance of the cell was evaluated.

When Examples 1 to 16 and Comparative example 1 are compared with each other, it is understood that the MEA using the gas diffusion layers (GDLs) in each of which the gas diffusion electrode materials of the present invention are supported on the carbon paper is more excellent in performance and durability in comparison with the MEA using the conventional gas diffusion layers (GDLs).

Moreover, when Examples 1 to 16 are compared with Comparative examples 2 and 3, in the case of Comparative examples 2 and 3, the density of the microfiber does not largely differ between the intermediate region and the surface region as shown in FIGS. 3A and 3B, and accordingly, the particles of the conductive material are held at substantially the same density in the intermediate region and the surface region as shown in FIG. 4. Therefore, it is considered that the performance and durability of these Comparative examples are decreased in comparison with the gas diffusion electrode of the present invention since the drainage in the electrode catalyst layers is decreased, and the movement of the water held in the electrolyte membrane is inhibited.

The entire contents of Japanese Patent Application No. 2005-281141 (filed on Sep. 28, 2005) and Japanese Patent Application No. 2006-46126 (filed on Feb. 23, 2006) are incorporated herein by reference.

The description has been made above of the contents of the present invention along the embodiments and the examples. However, it is self-evident to those skilled in the art that the present invention is not limited to the descriptions of these, and that various modifications and improvements are possible.

INDUSTRIAL APPLICABILITY

In accordance with the present invention, the polytetrafluoroethylene having the predetermined three-dimensional structure was used, and so on. Therefore, it is possible to provide the gas diffusion electrode material excellent in power generation characteristics and durability, to provide the production method thereof, and to provide the gas diffusion electrode thereof.

The invention claimed is:

1. A gas diffusion electrode material, comprising:
    a porous body formed of polytetrafluoroethylene microfibers and having three-dimensionally continuous micropores; and
    a conductive material supported on the porous body, contained in the three-dimensionally continuous micropores of the porous body, and forming the electrical conduction route in the porous body,
    wherein a density of the polytetrafluoroethylene microfiber is lower in a surface region of a cross section of the porous body than in an intermediate region of the cross section of the porous body.

2. The gas diffusion electrode material according to claim 1, wherein an amount of supporting the conductive material is higher in the surface region of the cross section of the porous body than in the intermediate region of the cross section of the porous body.

3. The gas diffusion electrode material according to claim 1, wherein a shape of the micropores formed between polytetrafluoroethylene microfibers is slit-like shape.

4. The gas diffusion electrode material according to claim 1, wherein a mass ratio of the polytetrafluoroethylene microfibers and the conductive material is represented by a following Formula (I):

(PTFE):(Conductor)=20 to 80:80 to 20    (1)

where PTFE is the polytetrafluoroethylene microfibers, and Conductor is the conductive material.

5. The gas diffusion electrode material according to claim 1, wherein the porous body has a thickness ranging from 5 to 50 μm, a porosity of 70% or more, and a pore diameter ranging from 0.5 to 45 μm.

6. The gas diffusion electrode material according to claim 1, wherein the gas diffusion electrode material has a porosity ranging from 40 to 85%, and a pore diameter ranging from 1 to 30 μm.

7. The gas diffusion electrode material according to claim 1, wherein the conductive material is carbon black having a particle diameter ranging from 0.5 to 2 μm, and a specific surface area ranging from 30 to 2000 m²/g.

8. An electrode catalyst layer of a gas diffusion electrode, wherein the electrode catalyst layer is composed by supporting an electrode catalyst on the as diffusion electrode material according to claim 1.

9. A gas diffusion electrode, wherein the gas diffusion electrode is composed by supporting the gas diffusion electrode material according to claim 1 by a gas-permeable conductive support material.

10. A gas diffusion electrode, wherein the gas diffusion electrode is composed by supporting the electrode catalyst layer according to claim 8 by a gas-permeable conductive support material.

11. A gas diffusion electrode, wherein the gas diffusion electrode is composed by supporting the gas diffusion electrode material according to claim 1 on an electrode catalyst layer supported on an electrolyte membrane.

12. The gas diffusion electrode material according to claim 1, wherein the density of the polytetrafluoroethylene microfiber is lower in both of front and back surface regions of the cross section of the porous body than in the intermediate region of the cross section of the porous body, and
an amount of supporting the conductive material is higher in both of the front and back surface regions of the cross section of the porous body than the intermediate region of the cross section of the porous body.

13. The gas diffusion electrode material according to claim 1, wherein the conductive material is fixed to a surface of the polytetrafluoroethylene microfibers forming the porous body, and is contained in the three-dimensionally continuous micropores of the porous body.

14. The gas diffusion electrode material according to claim 1, wherein a diameter of the polytetrafluoroethylene microfibers is 0.1 to 5 μm.

15. The gas diffusion electrode material according to claim 1, wherein the conductive material comprises any one of acetylene black or graphitized carbon black in which a specific surface area is 30 to 900 m²/g, an average lattice spacing d002 on a (002) plane in X-ray diffraction is 0.343 to 0.362 nm.

16. The gas diffusion electrode material according to claim 1, wherein an amount of a solid content including the conductive material is set at 0.5 to 3.0 mg/cm² per unit area of the porous body.

17. The gas diffusion electrode material according to claim 1, wherein the density of the polytetrafluoroethylene microfiber is lower in both of front and back surface regions of the cross section of the porous body than in the intermediate region of the cross section of the porous body, and an amount of supporting the conductive material is higher in both of the front and back surface regions of the cross section of the porous body than in the intermediate region of the cross section of the porous body,
wherein the porous body has a thickness ranging from 5 to 50 μm, a porosity of 70% or more, and a pore diameter ranging from 0.5 to 45 μm,
wherein the conductive material is carbon black having a particle diameter ranging from 0.5 to 2 μm, and specific surface area ranging from 30 to 2000 m²/g, and
wherein a mass ratio of the polytetrafluoroethylene microfibers and the conductive material is represented by a following Formula (I):

(PTFE):(Conductor)=20 to 80:80 to 20    (1)

wherein PTFE is the polytetrafluoroethylene microfibers, and Conductor is the conductive material.

* * * * *